Nov. 30, 1948.  B. H. CRIPPEN  2,454,994
COUPLING
Filed Aug. 29, 1947  2 Sheets-Sheet 2
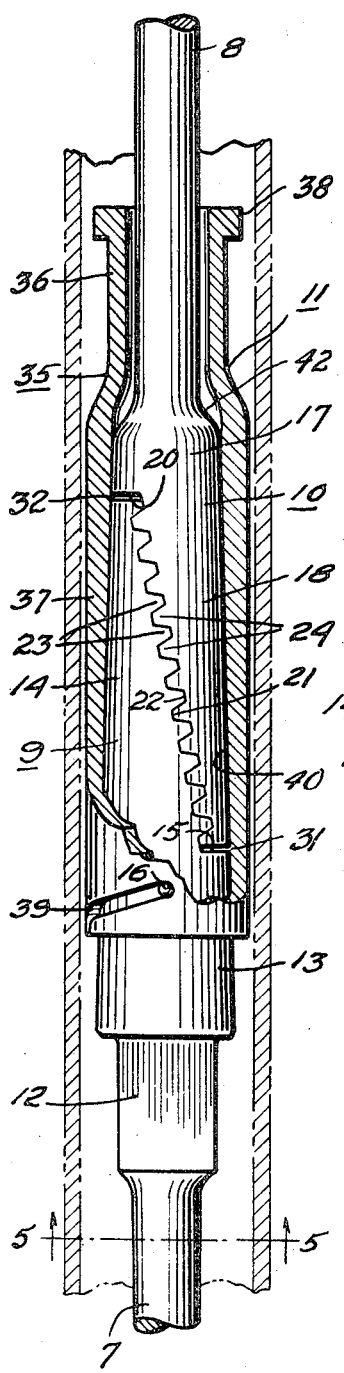
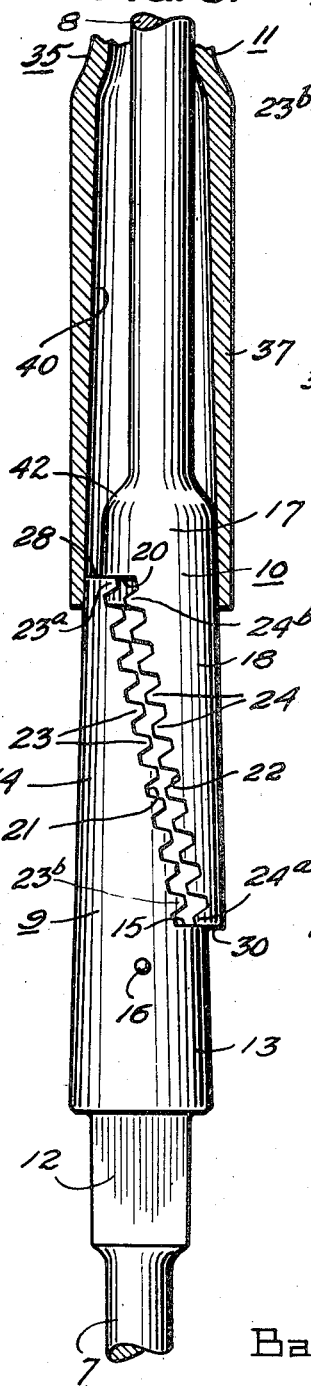
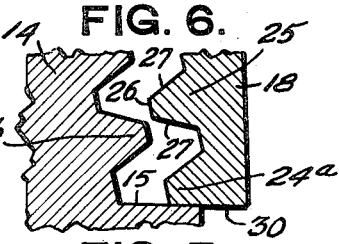
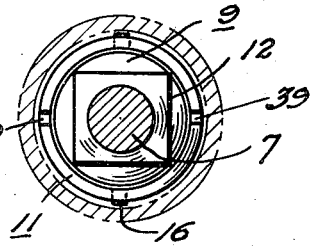
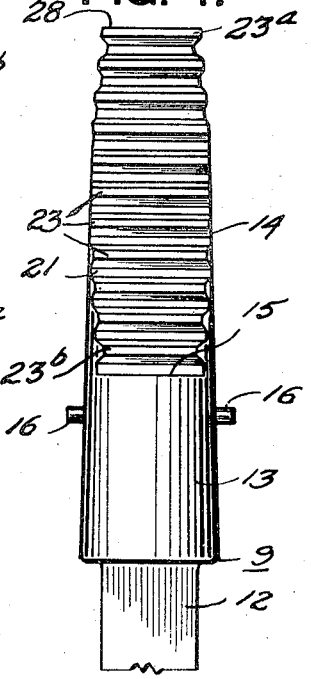
INVENTOR.
Basil H. Crippen
BY
ATTORNEYS.

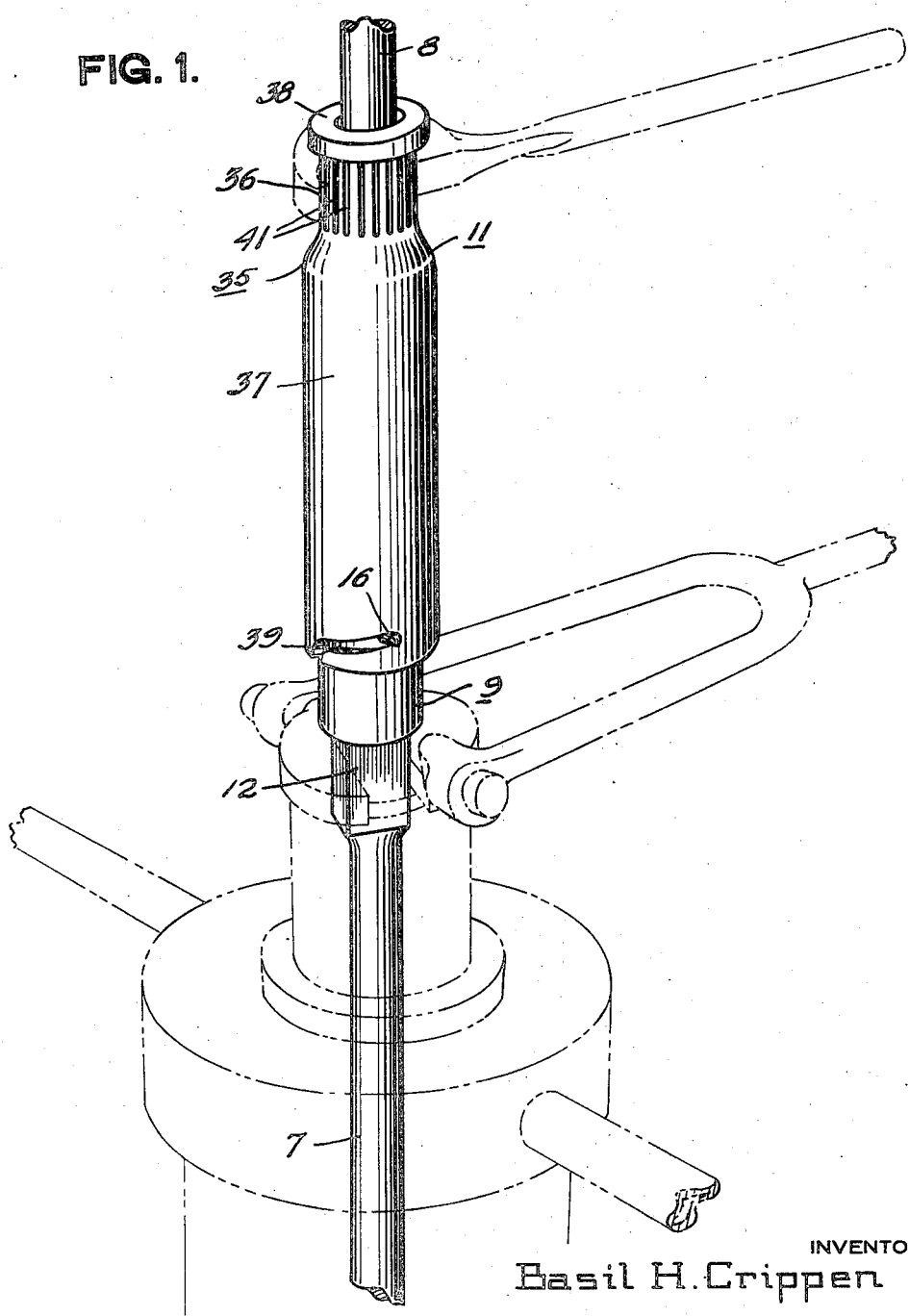

Patented Nov. 30, 1948

2,454,994

UNITED STATES PATENT OFFICE 2,454,994

COUPLING

Basil H. Crippen, Titusville, Pa.

Application August 29, 1947, Serial No. 771,327

2 Claims. (Cl. 287—104)

This invention relates to couplings and more particularly to means for connecting sucker rods together and to the polished rod and pump plunger used in pumping liquids from wells.

It is common practice to connect such units of pumping equipment, by box and pin tapered screw joints which are forged, machined and welded to the main body portions of the sucker rods. Such screw joints require considerable time and labor on the part of workmen to connect and disconnect. The joints must be screwed up very tight to prevent unscrewing when in operation, and in order to service wells, such as to replace a standing valve and/or working valve, the rods have to be pulled from the well and several of the joints disconnected, only to be connected again when putting the pumping equipment into condition for further operation.

The principal object of the present invention is to provide couplings which are simple in construction, since they embody no screw threads and may be easily machined, and easily coupled and uncoupled, thus reducing the cost of manufacture and the time and effort required to service wells.

Another object is to provide couplings not likely to be accidentally uncoupled while in use.

Other objects and advantages of the invention will appear in the following detailed description of the preferred embodiment of my invention, taken in connection with the accompanying drawings, forming a part of this specification and in which drawings:

Fig. 1 is a fragmentary perspective view of the coupling and portions of the sucker rods, suitable casing head and elevator of conventional types being shown by dot and dash lines.

Fig. 2 is a view partly in elevation, and partly in vertical section of the elements shown in full lines in Fig. 1, there also being shown a portion of well tubing in vertical section.

Fig. 3 is a view similar to Fig. 2, but omitting the tubing and showing the coupling parts in relationship to one another during the procedure of connecting the coupling.

Fig. 4 is a view in elevation of one of the coupling parts.

Fig. 5 is a cross sectional view on the line 5—5 of Fig. 2.

Fig. 6 is an enlarged, detailed, fragmentary, vertical sectional view showing characteristics of certain of the coupling parts in the relationship shown in Fig. 3.

In the drawings the invention is shown applied to the adjacent ends of companion sucker rods 7 and 8, the rod 8 being superjacent to rod 7, although it is to be understood that some parts of the couplings may be carried by a polished rod and another part by a pump plunger, not shown in the drawings, without departing from the spirit of the present invention.

The coupling comprises a head coupling member 9 rigid with the upper portion of rod 7, a foot coupling member 10 rigid with the lower portion of rod 8, and means 11 releasably holding the head and foot coupling members in coupling relationship. In practice, it is of course understood that, as a rule, each sucker rod will be provided with a head member 9 at its upper end, a foot member 10 at its lower end, and in the example shown, the means 11 is preferably arranged so that it cannot become detached from the sucker rod. The members 10 and 11 may be made rigid or integral with the sucker rod in any suitable manner, such as by being first forged and machined and then welded in place. In the example shown the upper end portion of rod 7 is shown provided with a wrench receiving enlargement 12 polygonal in cross section, but such is not absolutely necessary.

The head coupling member 9 preferably comprises a juncture portion 13, circular in cross section, coaxial with and joined to the rod 7, and an elongated beveled end 14 extending in the direction of the length of the rod and offset with respect to the axis of the juncture portion, providing a shoulder 15 facing toward the end of the coupling member 9, as shown in Figs. 2 and 3. The means 11 preferably includes one or more pins 16 carried by and extending radially of the juncture portion and their use will be subsequently set forth.

The foot coupling member 10 also preferably comprises a juncture portion 17, and elongated beveled end 18 similar to the portion 13 and end 14 of member 9, and with the beveled end 18 offset with respect to the axis of portion 17, providing a shoulder 20 facing toward the end of the coupling member 10.

Since the beveled ends 14 and 18 are complemental to form a part of a scarf-joint they have beveled faces 21 and 22, respectively which confront one another when the coupling is assembled and an important feature of the invention is to preferably form and arrange rack-like teeth 23 and 24 projecting from the faces 21 and 22, respectively.

By use of the term "rack-like" teeth, reference is had to the type of racks made for meshing relation with toothed gear wheels and for the production of which tools are provided for economical and rapid manufacture. These teeth are symmetrical in cross section as shown in Fig. 6, with the root 25 of each tooth wider than its point 26 presenting outwardly tapering tooth faces 27.

It is preferred to locate one of the teeth (that designated 23a) of coupling member 9 at the terminal 28 of its beveled end 14 and locate another of its teeth (that designated 23b) a distance greater than a tooth space from shoulder 15 as shown in Fig. 6, and to also locate one of the teeth (that designated 24a) of coupling member 10 at the terminal 30 of its beveled end 18 and locate another of its teeth (that designated 24b) a distance greater than a tooth space from shoulder 20, so that when the teeth of the two coupling members 9 and 10 are in interfitting relation, there are spaces 31 and 32 between the terminal 28 and shoulder 20, and terminal 30 and shoulder 15, respectively, as shown in Fig. 2.

By this arrangement, the shoulders 15 and 20 may be used to facilitate assembling the coupling members 9 and 10, as shown in Figs. 3 and 6, by bringing the terminals 30 and 28 into engagement therewith, while the teeth 23 and 24 are out of mesh, and then forcing the coupling members 9 and 10 toward each other, either manually or by use of means 11, whereupon the inclined faces 27 of the teeth of one coupling member will ride upon the faces 27 of the teeth of the other coupling member as is obvious from an inspection of Fig 6, until they are in meshing or inter-fitting relationship. Thus, in the preferred embodiment of the invention, when producing several of the coupling members 9 and 10, they may be forged to shape, placed side by side and machined to produce the teeth by ordinary tools used in producing rack-teeth.

Any inaccuracies in the over-all lengths of the beveled ends 14 and 18 will not be detrimental since the spaces 31 and 32 are ample to allow for self interfitting of the teeth, even tho one of the beveled ends be slightly shorter than standard due to imperfections in manufacture or mutilation resulting from careless standing of the sucker rods on end, or slightly longer than standard, due to imperfections in manufacture.

As means for releasably holding the head and foot coupling members in coupling relationship, I prefer to provide a retaining sleeve 35 cooperating with the aforementioned pin or pins 16, and to have a taper fit between the sleeve 35 and the members 9 and 10. With this end in view, the members 9 and 10 are constructed and arranged complemental to one another to form a scarf-joint circular in cross section and tapering in a direction axially of the rods 7 and 8 as shown in Fig 2 with the larger end at juncture portion 13 and the smaller end at juncture portion 17. The sleeve 35 encircles rod 8 and preferably comprises a neck portion 36, a tapered major portion 37 at one end of the neck portion, and a flange 38 at the other end of the neck portion. For cooperation with each pin 16, the tapered portion 37 is provided with a bayonet slot 39 open at its larger end. The tapered bore 40 of tapered portion 37 is made for intimate contact with the tapered exterior of the coupling members 9 and 10, and the bayonet slot 39 and cooperating pin 16 are located so that the pin binds in the slot when this intimate contact has been attained. In the example shown the neck portion 30 is provided with wrench receiving faces 41 to facilitate tightening and loosening the sleeve 35 with respect to the coupling members and the pin or pins 16. It is obvious from the drawings that, by locating the sleeve on the sucker rod with its neck portion 36 between the head and foot coupling members thereon, the sleeve cannot become detached from the rod.

When the coupling is to be assembled, the parts may be initially placed as shown in Fig. 3, with the head and foot coupling members engaging one another only at the terminal 28 and shoulder 20 and at terminal 30 and shoulder 15. At this time the sleeve 35 may be held in substantially the position shown in Fig. 3 or even held higher with respect to member 10. This initial positioning of the parts may be accomplished by "feel" so to speak, and in this respect the present invention differs from ordinary scarf-joints and joints heretofore proposed for joining shafts, draft rods, sucker rods and the like. While the teeth 23 and 24 may be brought into interfitting relation manually, such as by forcing the two members 9 and 10 toward each other, the likelihood of the hands of the operators being pinched is avoided if this interfitting relationship is accomplished by sliding or driving the sleeve 35 downwardly as by tapping a tool upon the flange 38. If the pins 16 and the bayonet slots 39 are provided a spanner wrench may be used in engagement with the wrench receiving faces 41 to tighten the parts as illustrated in Fig. 1, where a spanner wrench is shown by dot and dash lines. When the coupling is made secure, and is under either tension or compression, the tapered sides 27 of the teeth tend to cause separation of the coupling members 9 and 10 if not restrained by the sleeve 40, but with the sleeve firmly in place, this tendency is only to force the members 9 and 10 into very intimate contact with the bore of the sleeve 35.

If desired the juncture portion 17 may merge with the rod 8 at a frusto conical, upwardly facing shoulder 42 whereby the sleeve 35, if held with its lower margin above the shoulder 42 and permitted to drop or manually slide down the rod 8, may be guided by the shoulder 42 to a position embracing the coupling members 9 and 10.

I claim:

1. A coupling for sucker rods and the like, comprising a head coupling member rigid with and carried by the upper portion of one of said rods, a foot coupling member rigid with and carried by the lower portion of another of said rods superjacent to said first mentioned rod, said head and foot coupling members each including an elongated beveled end and a juncture portion between said beveled end and its respective rod, said juncture portion being coaxial with the axis of its respective rod, said elongated beveled end extending in the direction of the length of its respective rod and offset with respect to the axis of its respective juncture portion providing a shoulder at the juncture portion facing toward the end of the coupling member, said beveled ends being complemental to form a part of a scarf-joint between the rods, the confronting faces of said complemental beveled ends being provided with rack-like teeth extending crosswise of the coupling, interfitting with one another and formed and arranged to space the terminals of each beveled end from the said shoulder of its companion coupling member when the teeth are in said interfitting relation, and means releasably holding said coupling members with said teeth in said interfitting relationship.

2. A coupling for sucker rods and the like, comprising a head coupling member rigid with and carried by the upper portion of one of said rods, a foot coupling member rigid with and carried by the lower portion of another of said rods superjacent to said first mentioned rod, said head and foot coupling members each including an elongated beveled end and a juncture portion between said beveled end and its respective rod, said juncture portion being coaxial with the axis of its respective rod, said elongated beveled end extending in the direction of the length of its respective rod and offset with respect to the axis of its respective juncture portion providing a shoulder at the juncture portion facing toward the end of the coupling member, said beveled ends being complemental to form a part of a scarf-joint between the rods, the confronting faces of said complemental beveled ends being provided with rack-like teeth extending crosswise of the coupling, interfitting with one another, and there being one of said rack-like teeth at the terminal of each beveled end, and one of said rack-like teeth on each beveled end adjacent to but spaced from the said shoulder a distance greater than a tooth space, whereby there are spaces between the terminals of the beveled ends and said shoulders when the teeth are in said interfitting relation, and means releasably holding said coupling members in said interfitting relationship.

BASIL H. CRIPPEN.

REFERENCES CITED

The following references are of record in the file of this patent:

UNITED STATES PATENTS

| Number | Name | Date |
| --- | --- | --- |
| 53,219 | Fawcett | Mar. 13, 1866 |
| 904,603 | Crocker | Nov. 24, 1908 |
| 1,978,643 | McKettrick | Oct. 30, 1934 |
| 2,056,739 | Rabezzana | Oct. 6, 1936 |
| 2,204,103 | Lampkin | June 11, 1940 |